Feb. 7, 1933.  E. TRANAAS  1,896,987
DISCHARGE CHUTE ACTUATING MECHANISM
Filed Oct. 14, 1929   3 Sheets-Sheet 1
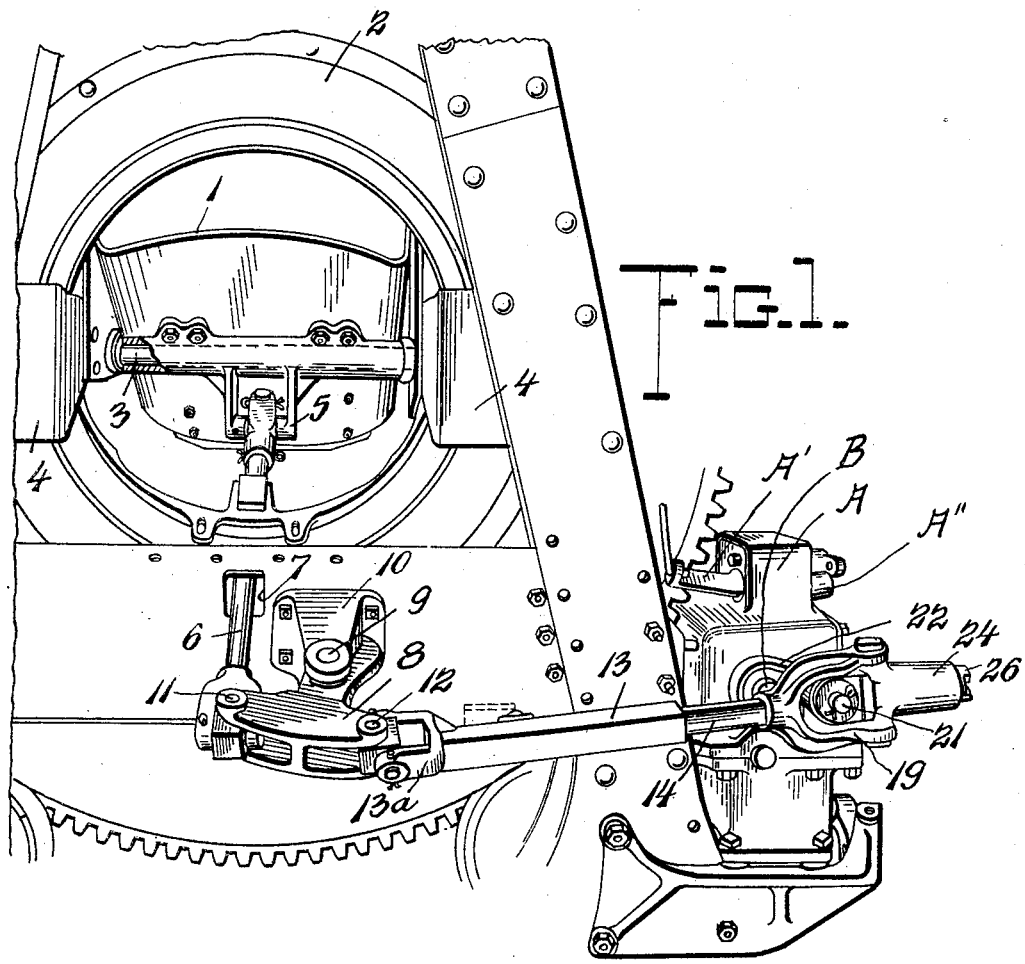
INVENTOR
E. Tranaas
BY
ATTORNEYS Feb. 7, 1933. E. TRANAAS 1,896,987
DISCHARGE CHUTE ACTUATING MECHANISM
Filed Oct. 14, 1929   3 Sheets-Sheet 2
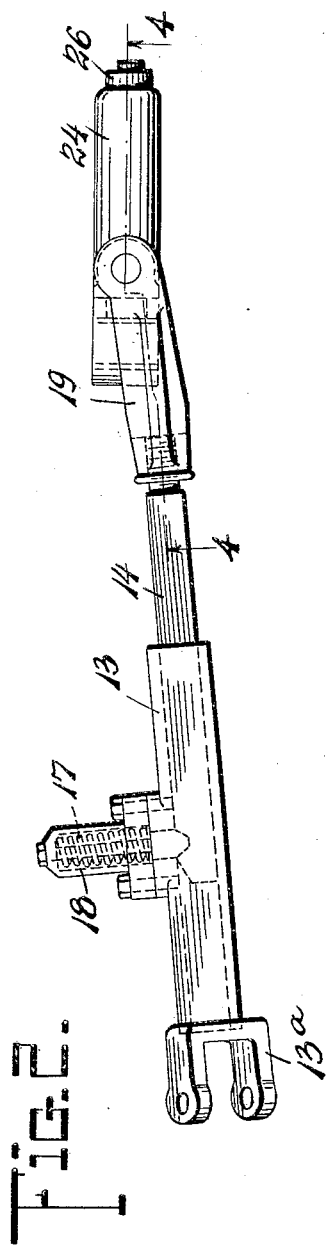
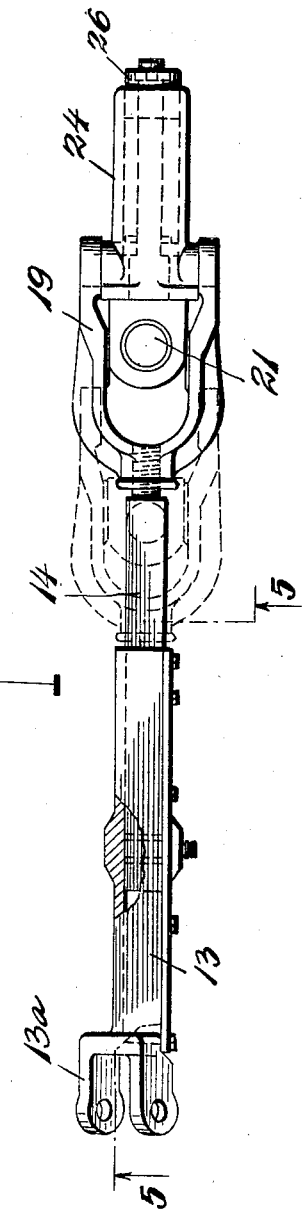
INVENTOR
E. Tranaas.
BY
ATTORNEYS Feb. 7, 1933.　　　　　E. TRANAAS　　　　　1,896,987
DISCHARGE CHUTE ACTUATING MECHANISM
Filed Oct. 14, 1929　　　3 Sheets-Sheet 3
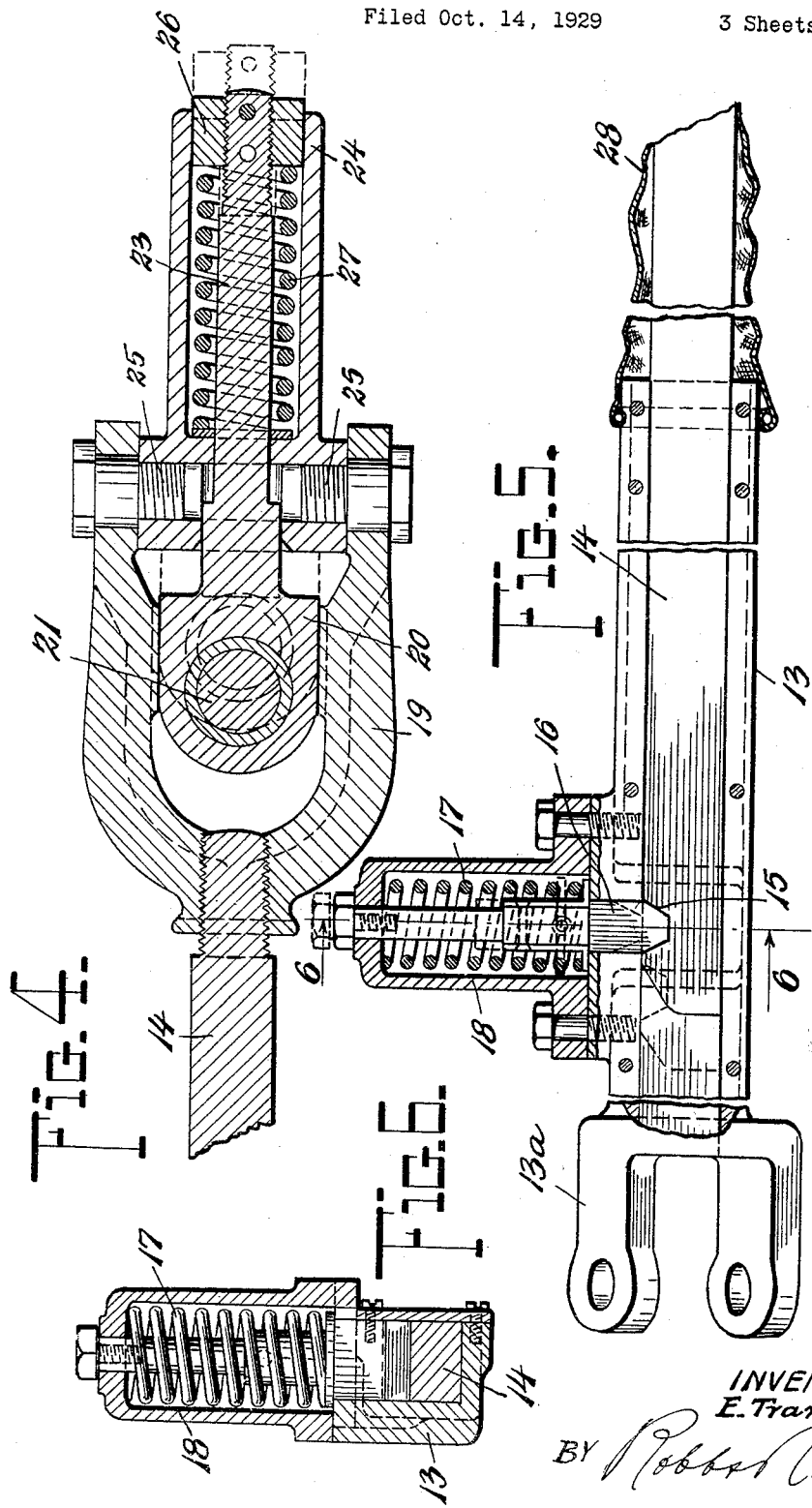
INVENTOR
E. Tranaas.
BY Robert Cobb
ATTORNEYS Patented Feb. 7, 1933

1,896,987

UNITED STATES PATENT OFFICE

EMIL TRANAAS, OF MILWAUKEE, WISCONSIN, ASSIGNOR TO KOEHRING COMPANY, OF MILWAUKEE, WISCONSIN, A CORPORATION

DISCHARGE CHUTE ACTUATING MECHANISM

Application filed October 14, 1929. Serial No. 399,555.

The purpose of this invention has been to devise a special form of safety connection located between a power operating device forming a part of a concrete mixing machine, and the discharge chute of said machine; also a special form of cushion means for cushioning the driving action of the power device as the power is applied to move the discharge chute.

In larger concrete mixers as built today the discharge chute is employed frequently as a mixing element upon which the contents of the mixer pour and by which the mixing action of the machine is assisted. Additional to its mixing function the chute, of course, is movable to a position for discharging the contents of the mixer. A very considerable amount of power is required in order to move the chute from its mixing position to discharging position, the inertia of the falling aggregates upon the chute as well as the size of the chute offering a resistance which is dealt with primarily by the cushioning appliance forming a part of this invention. Again, at times the discharge chute may become jammed by a stone or other portion of the aggregates, temporarily preventing its movement from mixing to discharge position, and vice versa. The safety connection feature of this invention deals with this condition in that it provides parts enabling the power discharge device to operate even though the discharge chute may not move without breakage of the connecting parts.

In the accompanying drawings:

Figure 1 is a front elevation of a portion of a mixing machine disclosing the invented mechanism in the position that it occupies when the discharge chute is in mixing position.

Figures 2 and 3 are elevations of the safety cushioning link, the views being taken at right angles to each other and parts being broken away.

Figure 4 is an enlarged longitudinal sectional view taken approximately on the line 4—4 of Figure 2, showing the normal position of the parts in dotted lines, and in full lines the position when a slight cushioning action occurs.

Figure 5 is a view similar to Figure 4 but taken on the line 5—5 of Figure 3.

Figure 6 is a sectional view on the line 6—6 of Figure 5.

Referring to the accompanying drawings, and especially to Figure 1, I have illustrated at A what is usually known as the power discharge unit comprising an enclosed mechanism operable to cause the turning of a power shaft B which is the operating member for moving the discharge chute 1 of the mixing drum 2, which is the only portion of the mixing mechanism of the machine illustrated, in addition to the chute 1.

The details of construction of the power mechanism A are immaterial to the invention. The mechanism is designed to be started either manually or automatically; automatically by the actuation of a lever A' from a batch meter appliance, so known to those versed in the art; and manually by the movement of a foot piece A" in a manner immaterial so far as the present invention is concerned.

The chute 1 is pivotally supported by a shaft 3, carried by brackets 4 on the frame of the machine. Connected with a rocker arm 5 on the under side of the chute is an actuating link 6, suitably guided in a framework by an opening 7, and attached to one end of a rocker lever 8 of three-armed formation, one arm pivotally supported at 9 on a bracket 10, another arm pivotally connected with the link 6 at 11, and the third arm pivotally connected at 12 with the safety and cushion connection 13, forming the special feature of this invention.

The safety and cushion connection 13 is seen best in Figures 2 to 6, inclusive as comprising a body portion formed with a yoke 13—a cooperative with the connection 12, and in which body portion slides in a telescopic manner the inner section 14 of the connection. This section 14 is merely a bar preferably of square formation, moving in the hollow portion of the body of the connection 13, and having a notch 15 near its inner end in which engages normally a spring actuated detent 16, see Figure 5, said detent being maintained in cooperation with the bar or section 14 by the spring 17, and a suitable housing 18 being provided for the parts 16 and 17. The housing 18 is attached to the body of the connection 13. At its outermost or right hand end, the sliding section 14 of the connection 13 has a yoke 19 which embraces or receives therein the bearing and slide block 20. The block 20 is movable between the sides of the yoke, and has a bearing receiving the crank pin 21 of the crank arm 22 on the power shaft B. Said block 20 is formed with a stem 23 mounted in a sleeve or housing 24, pivoted to the yoke 19 by the screw members 25. A nut 26 at the outer end of the stem 23 bears against one end of a spring 27 in the sleeve or housing 24. The other end of the spring has a suitable bearing against a wall formation near the inner end portion of the sleeve or housing 24, and the stem 23 is shiftable in the housing as the nut 26 is pulled inwardly when power is applied to the slide block 20, tending to shift the connection 13 to the left.

If desired, in order to keep dirt and grit, or foreign matter away from this section 14 of the connection 13, a flexible casing member 28 may be utilized to cover the part 14 by being attached at one end to the hollow body of the connection 13.

With the foregoing construction in mind, the operation of the invention is simple. Assuming the parts to be in the positions shown in Figure 1, the discharge chute being at the mixing adjustment, and the slide block 20 engaging the wall established by the inner end housing 24, if power is now applied to the shaft B to turn the same, the crank arm 22 will rotate a half revolution by reason of the action of the parts of the power discharge mechanism A. Obviously, the crank pin 21 will move on an arc of 180° to the left. Initially, in view of the weight of the falling aggregates upon the chute 1, and the inertia of the operating connections, etc., the slide block 20 will move to the left, and the spring 27 will be compressed slightly, depending upon the particular conditions. This action is shown in Figure 4. If the resistance is very heavy, the slide block 20 will move all the way over to the point of screw connection of the member 14 with the yoke 19. This usually only happens, however, when the chute 1 becomes jammed, for in the normal operation of the machine, after slight compression of the spring 27, the movement of the crank pin 21 will be transmitted to the connection 13, and through the connection 13 to the parts 8, 6 and 5 of the chute 1. The provision of the pin 21 therefore assures absorption of driving shocks before motion is imparted to the bar or rod 14, thus preventing release of the detent 16 during normal operation of the mechanism.

Should the chute 1 become jammed so that it cannot move on account of a stone or other obstacle lodging between the chute and its supporting parts, when the power is applied with the parts as shown in Figure 1, the resistance will be so great that the inner section 14 of the connection 13 will slide leftwards into the dotted line position of Figure 5, and will cam outward the detent 16, so that all that is produced by way of movement is a relative sliding or telescopic action of the parts 13 and 14. The working end of the detent 16 has inclines at opposite sides so that the camming operation above mentioned will take place. In the above manner, the connection 13 affords safety against breakage of the parts. The action is just the opposite so far as camming out of the detent 16 is concerned, if the chute 1 happens to be in its discharging position, and the power is applied to produce a half revolution of the crank pin 21, to return the chute to its mixing position. Of course, at times it will be possible in the operation of the machine, should slippage of the parts 13 and 14 take place, to cause a substantial movement of the chute by throwing in the power at the mechanism A, and thus cause dislodgment of the stone or other obstacle that causes the chute 1 to jam.

What is claimed as new is:—

1. Mechanism for actuating the discharge chute of a concrete mixing drum comprising a shaft for transmitting power from a power source to the chute, a pitman connected to the shaft and chute, the inter-connection between the pitman and shaft comprising a yoke, a member mounted on the shaft and slidable in the yoke, the said member being provided with a stem, a resilient cushioning means for the stem, and a housing pivotally mounted on the yoke and enclosing the said stem and cushioning member, whereby power from the said shaft is yieldingly transferred to the said pitman.

2. Mechanism for actuating the discharge chute of a concrete mixing drum, comprising a pitman made up of relatively movable parts and means normally forcing the said parts against relative movement but yieldable upon meeting sufficient resistance to permit such relative movement, the pitman having secured thereto yieldable cushioning instrumentalities comprising a yoke, a block movable within the yoke and provided with a stem threaded at one end thereof, a power shaft for transmitting power thereto, a housing enclosing the stem and pivotally connected to the yoke, a nut threaded on the stem and substantially closing the housing, and a cushioning member around the stem and acting against the housing and nut to cushion movements of the pitman.

In testimony whereof I affix my signature.

EMIL TRANAAS.